United States Patent Office 3,281,207
Patented Oct. 25, 1966

3,281,207
RECOVERY OF ZIRCONIUM COMPOUNDS FROM ALKALI METAL ZIRCONIUM SILICATES
Eugen Meyer-Simon and Artur Frey, Frankfurt am Main, Germany, assignors to Deutsche Gold- und Silber-Scheideanstalt vormals Roessler, Frankfurt am Main, Germany
No Drawing. Filed Oct. 19, 1962, Ser. No. 231,812
Claims priority, application Germany, Oct. 26, 1961, D 37,314
4 Claims. (Cl. 23—117)

The present invention relates to an improved process for the production of zirconium compounds, especially especially zirconium oxide, from alkali metal zirconium silicates by reacting such silicates with acids and, if desired, with subsequent hydrolysation and calcination.

In carrying out such reaction it has, for example, been proposed to employ hydrochloric acid or sulfuric acid which with proper temporal and temperature control of the progress of the reaction is said to produce a precipitated silica which is filterable. Such proposed procedures, however, possess certain disadvantages.

In the decomposition of sodium zirconium silicate with hydrochloric acid a ripening or ageing of the soft crumbly mass produced of more than 5 hours is necessary. The slurrying of such a mass in order to carry out the filtration requires a rather powerful stirrer as such mass is in a relatively solid state. The filterability even then is only mediocre. It has already been attempted to accelerate the precipitation of the silica by several hours' heating while stirring. At a temperature of 105 to 108° C. the mass remains stirrable but, nevertheless, it is difficult to filter.

When, on the other hand, sulfuric acid is used under the same conditions for the decomposition of sodium zirconium silicate, an easily filterable silicic acid separates out after 1–2 hours' heating, but such process has the disadvantage that no easily filterable basic zirconium sulfate precipitates from the filtrate upon neutralization of the acid.

According to the invention it was found that these difficulties of the known processes do not occur when a combination of hydrochloric acid and sulfuric acid is employed in which the quantity of sulfuric acid is 0.5–0.8 mol, preferably 0.55 mol per mol of $ZrO_2$. The quantity of hydrochloric acid employed is 2 mol HCl per mol of $Na_2O$ and 1.5–2.2 mol HCl per mol of $ZrO_2$. Such combination of acids can be employed sequentially or simultaneously, for example, the HCl may be added to the alkali metal zirconium silicate first and the $H_2SO_4$ only added thereto thereafter or a mixture of such acids may be added to the alkali metal zirconium silicate.

The use of such a combination of acids effects a good and simple silicic acid separation whereby after 1–2 hours' heating to about 90 to 110° C., while stirring, without prior ripening, the silicic acid can be separated off completely and quickly by filtration. Upon subsequent neutralization of the excess acid in the filtrate and control of the hydrolysis temperature a basic zirconium sulfate of controlled grain size can be obtained from which a very pure zirconium oxide can be recovered upon calcination.

Clouding which may occur during washing of the silicic acid with water can be avoided by using a washing solution containing about 4% of NaCl and 1% of HCl.

The process according to the invention is illustrated in the following examples.

*Example 1*

Moist sodium zirconium silicate obtained by the autoclave decomposition process consisting of 13.5 kg. $Na_2O.ZrO_2.SiO_2$ and about 4.5 liters of adhering moisture was quickly introduced into a mixture of 24 liters of crude hydrochloric acid (30% with 350 g. HCl/l. or a total of 8400 g. HCl) and the mixture stirred thoroughly. The temperature during such stirring rose to 94° C. A light glassy rather thin slurry formed (which on longer stirring under these conditions became thick).

After 4 minutes, 1 liter of cold water was added and stirred in and half of a diluted sulfuric acid solution (1.585 liter conc. sulfuric acid 96% with 1760 g. $H_2SO_4/l$. or a total of 2800 g. $H_2SO_4$ diluted with 3 liters of water) was added. The original thickening was eliminated after stirring a few minutes. Thereupon the other half of the diluted sulfuric acid solution was added and the mixture stirred. The mixture was then heated to 105° C. by direct introduction of steam and stirred for 1 hour at this temperature in a well sealed vessel. The relatively thin light glassy slurry which was formed was diluted with water containing 4% of NaCl and 1% of HCl and cooled while slowly stirring.

The separation of the precipitated silicic acid was then effected very quickly upon a filter press. The filtrate was free of silicic acid.

Analogous results were obtained when the moist sodium zirconium silicate was first stirred in 6.5 liters of water and then 24 liters of crude HCl quickly added thereto rather than adding the sodium zirconium silicate to the crude HCl and water mixture, the remaining processing conditions being the same.

*Example 2*

18 kg. of moist sodium zirconium silicate as in Example 1 were admixed with mixed acid consisting of 20.2 liter HCl (350 g./l. total 7070 g.) and 2.46 liters concentrated $H_2SO_4$ (1760 g. $H_2SO_4/l$. total 4320 g.), which was diluted with 6 liters of water.

The mixture was then heated to about 105° C. with steam and stirred at this temperature for about 1 hour. The resulting thin slurry was then processed as in Example 1.

In order to precipitate out basic zirconium sulfate from the clear silicic acid free filtrates obtained in the above examples it was only necessary to neutralize the excess acid with aqueous NaOH, soda or ammonia. Upon boiling a precipitate was formed which contained all of the zirconium. The resulting zirconium sulfate can be recovered in fine or coarse grained form depending upon the manner in which the neutralized solution is treated to effect the hydrolysis. When such neutralized solution is heated very rapidly to 95 to 100° C. a fine grained precipitate results which upon calcination produces a fine grained zirconium oxide. When, on the other hand, such neutralized solution is first stirred cold for about 1 hour, then heated to 45° C. with stirring until clouding occurs and then heated slowly to 100° C. coarse grained basic zirconium sulfate is produced because of the seeding action of the clouding which was previously effected. Coarse grained zirconium oxide can be produced by the calcination thereof.

We claim:

1. In a process for the recovery of zirconium values by reaction of an alkali metal-zirconium silicate with acid to decompose such silicate to form silicic acid and a soluble zirconium compound, the steps which comprise mixing such alkali metal zirconium silicate under aqueous conditions with a combination of hydrochloric acid and sulfuric acid, the quantity of hydrochloric acid being such as to provide 2 mol HCl per mol of alkali metal oxide and 1.5 to 2.2 mol HCl per mol of $ZrO_2$ and the quantity of sulfuric acid being such as to provide 0.5–0.8 mol $H_2SO_4$ per mol of $ZrO_2$ in the starting silicate, heating such mixture to a temperature between about 90° C. and 110° C. while stirring until a filterable silicic acid has separated out and filtering off such silicic acid to leave a filtrate containing zirconium values dissolved therein.

2. The process of claim 1 in which the heating while stirring to effect the separation of the filterable silicic acid is carried out over a period of about 1 to 2 hours.

3. The process of claim 2 in which an aqueous solution of 4% NaCl and 1% of HCl is mixed with the heated mixture containing the filterable silicic acid before the filtration.

4. The process of claim 2 comprising in addition neutralizing the filtrate and heating the neutralized solution to effect precipitation of basic zirconium sulfate.

References Cited by the Examiner
UNITED STATES PATENTS
2,387,046  10/1945  Wainer _____ 23—24.1

OSCAR R. VERTIZ, Primary Examiner.
MAURICE A. BRINDISI, Examiner.